US008865839B2

(12) United States Patent
Sawada et al.

(10) Patent No.: US 8,865,839 B2
(45) Date of Patent: *Oct. 21, 2014

(54) POLYTETRAFLUOROETHYLENE MIXTURE

(75) Inventors: Yasuhiko Sawada, Settsu (JP); Shunji Kasai, Settsu (JP); Taku Yamanaka, Settsu (JP); Makoto Ono, Settsu (JP); Yoshiyuki Shibuya, Yuki (JP); Kunihiko Inui, Settsu (JP); Shinichi Chaen, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/996,039

(22) PCT Filed: Dec. 21, 2011

(86) PCT No.: PCT/JP2011/079692

§ 371 (c)(1),
(2), (4) Date: Jun. 20, 2013

(87) PCT Pub. No.: WO2012/086710

PCT Pub. Date: Jun. 28, 2012

(65) Prior Publication Data

US 2013/0281558 A1    Oct. 24, 2013

(30) Foreign Application Priority Data

Dec. 21, 2010  (JP) .................................. 2010-284985

(51) Int. Cl.
| C08L 27/12 | (2006.01) |
| C08F 14/18 | (2006.01) |
| C08J 5/18 | (2006.01) |
| C08L 29/10 | (2006.01) |
| C08L 27/18 | (2006.01) |

(52) U.S. Cl.
CPC ............. *C08L 29/10* (2013.01); *C08L 2205/02* (2013.01); *C08J 2327/18* (2013.01); *C08J 5/18* (2013.01); *C08L 27/18* (2013.01)
USPC ............................ 525/199; 526/255; 524/546

(58) Field of Classification Search
USPC ........... 524/544, 545, 546; 526/255; 521/145; 525/199
See application file for complete search history.

(56) References Cited

U.S. PATENT DOCUMENTS

| 5,110,527 A | 5/1992 | Harada et al. |
| 5,225,131 A | 7/1993 | Tamaru et al. |
| 5,403,524 A | 4/1995 | Burger et al. |
| 5,708,044 A * | 1/1998 | Branca .......................... 521/145 |
| 5,910,277 A | 6/1999 | Ishino et al. |
| 2007/0009727 A1 * | 1/2007 | Sawada et al. ............. 428/304.4 |
| 2009/0281231 A1 * | 11/2009 | Kasai et al. .................... 524/546 |
| 2010/0006497 A1 | 1/2010 | Thottupurathu |
| 2013/0158220 A1 | 6/2013 | Uehara et al. |

FOREIGN PATENT DOCUMENTS

| EP | 2583735 A1 | 4/2013 |
| JP | 3-17136 A | 1/1991 |
| JP | 3-258532 A | 11/1991 |
| JP | 7-53755 A | 2/1995 |
| JP | 9-12902 A | 1/1997 |
| JP | 10-30031 A | 2/1998 |
| JP | 10-505378 A | 5/1998 |
| JP | 11-240917 A | 9/1999 |
| JP | 2008-63488 A | 3/2008 |
| JP | 2010-18800 A | 1/2010 |
| JP | 2011-79879 A | 4/2011 |
| JP | 2012-45812 A | 3/2012 |
| WO | 96/07529 A1 | 3/1996 |
| WO | 2011/158717 A1 | 12/2011 |

OTHER PUBLICATIONS

International Preliminary Report on Patentability with Written Opinion of the International Searching Authority for PCT/JP2011/079692.
International Preliminary Report on Patentability with Written Opinion of the International Searching Authority for PCT/JP2011/079709.
International Preliminary Report on Patentability with Written Opinion of the International Searching Authority for PCT/JP2011/079715.
International Preliminary Report on Patentability with Written Opinion of the International Searching Authority for PCT/JP2011/079723.
International Search Report for PCT/JP2011/079723 dated Mar. 6, 2012.
International Search Report for PCT/JP2011/079715 dated Feb. 28, 2012.
International Search Report for PCT/JP2011/079709 dated Apr. 3, 2012.
International Search Report for PCT/JP2011/079692 dated Apr. 3, 2012.
Extended European Search Report, dated Jul. 7, 2014, issued by the European Patent Office, in counterpart Application No. 11851762.2.

* cited by examiner

*Primary Examiner* — Kara Boyle
(74) *Attorney, Agent, or Firm* — Sughrue Mion, PLLC

(57) ABSTRACT

Provided is a material that can be easily biaxially oriented, homogeneously stretched even with a high draw ratio, and formed into a polytetrafluoroethylene porous membrane with low pressure loss. The present invention relates to a polytetrafluoroethylene mixture comprising: a modified polytetrafluoroethylene; and a fibrillable polytetrafluoroethylene homopolymer, the modified polytetrafluoroethylene having an extrusion pressure to a cylinder, at a reduction ratio of 1600, of 70 MPa or higher.

8 Claims, 2 Drawing Sheets

POLYTETRAFLUOROETHYLENE MIXTURE

CROSS REFERENCE TO RELATED APPLICATIONS

This application is a National Stage of International Application No. PCT/JP2011/079692 filed Dec. 21, 2011, claiming priority based on Japanese Patent Application No. 2010-284985 filed Dec. 21, 2010, the contents of all of which are incorporated herein by reference in their entirety.

TECHNICAL FIELD

The present invention relates to a polytetrafluoroethylene mixture suitably used as a stretchable material for a polytetrafluoroethylene porous membrane.

BACKGROUND ART

Polytetrafluoroethylene porous membranes are porous materials having countless fine holes thereinside, and are made of a polytetrafluoroethylene (hereinafter, referred to as a "PTFE") excellent in heat resistance and chemical resistance. Polytetrafluoroethylene porous membranes are used in various applications, for example, used as filters in clean rooms, air conditioners, and turbines.

For example, Patent Literature 1 discloses a polytetrafluoroethylene porous material used for microfiltration filters and the like. The PTFE porous material is formed of a mixture of a PTFE having an average molecular weight of 2 million or more with a PTFE having an average molecular weight of 1 million or less.

Patent Literature 2 discloses a stretched porous polytetrafluoroethylene material containing a microstructure in which nodes are interconnected by fibrils for the purpose of giving heat stability to materials to be formed into a tape, a filament, a film, a stick, or a tube. The stretched porous polytetrafluoroethylene material includes a mixture of two different polymers. One of the polymers is a polytetrafluoroethylene homopolymer and the other is a modified polytetrafluoroethylene polymer.

Patent Literature 3 discloses a porous polytetrafluoroethylene prepared by mixing a high-molecular-weight emulsion polymer with a polytetrafluoroethylene radiation-chemically decomposed, and extruding the resulting mixture.

Patent Literature 4 discloses a porous stretched PTFE article that includes a stretched PTFE resin containing the first PTFE resin fine particles and the second PTFE resin fine particles. The first PTFE resin has a property to form more fibrils than the second PTFE resin, and the fibrils in the first PTFE resin are longer than those formed in the second PTFE resin. The second PTFE resin has a property to form nodes with a width greater than that of nodes formed in the first PTFE resin. The stretched PTFE article contains a plurality of nodes and fibrils and has a thickness of about 100 μm or larger.

CITATION LIST

Patent Literature

Patent Literature 1: JP 03-17136 A
Patent Literature 2: JP 10-505378 T
Patent Literature 3: JP 07-53755 A
Patent Literature 4: JP 2010-018800 A

SUMMARY OF INVENTION

Technical Problem

In order to use a PTFE porous membrane as a filter, a material that can be made into a PTFE porous membrane which can be homogeneously stretched and has low pressure loss is required. Patent Literatures 1 to 4 disclose blend of two types of PTFEs. However, a PTFE porous membrane produced from the conventional PTFEs cannot be uniformly stretched while maintaining low pressure loss. For example, the mixture disclosed in Patent Literature 2 is difficult to be biaxially oriented with a high draw ratio, even though it enables low pressure loss. Further, the mixture disclosed in Patent Literature 3 is difficult to be biaxially oriented to be easily broken during the mixture is stretched.

In view of the above state of the art, the present invention aims to provide a material that can be easily biaxially oriented, homogeneously stretched even with a high draw ratio, and formed into a polytetrafluoroethylene porous membrane with low pressure loss.

Solution to Problem

As a result of intensive investigations by the present inventors, it has been found that a mixture of a fibrillable polytetrafluoroethylene homopolymer with a modified polytetrafluoroethylene that shows a high cylinder extrusion pressure can provide a material easily biaxially oriented, stretched while maintaining homogeneous membrane appearance, and formed into a polytetrafluoroethylene porous membrane with low pressure loss.

That is, one aspect of the present invention is a polytetrafluoroethylene mixture comprising: a modified polytetrafluoroethylene; and a fibrillable polytetrafluoroethylene homopolymer, the modified polytetrafluoroethylene having a cylinder extrusion pressure, at a reduction ratio of 1600, of 70 MPa or higher.

The modified polytetrafluoroethylene preferably has a cylinder extrusion pressure, at a reduction ratio of 1600, of 80 MPa or higher.

The mass ratio of the modified polytetrafluoroethylene to the polytetrafluoroethylene homopolymer (modified polytetrafluoroethylene/polytetrafluoroethylene homopolymer) is preferably 10 to 90/90 to 10.

The modified polytetrafluoroethylene preferably includes a modified monomer unit in an amount of 0.005 to 0.500 wt % of the weight of all monomer units.

The modified polytetrafluoroethylene preferably has a standard specific gravity (SSG) of 2.130 to 2.185.

The polytetrafluoroethylene homopolymer preferably has a cylinder extrusion pressure, at a reduction ratio of 100, of 10 to 35 MPa.

The polytetrafluoroethylene homopolymer preferably has a cylinder extrusion pressure, at a reduction ratio of 100, of 10 to 20 MPa.

The polytetrafluoroethylene mixture of the present invention is preferably obtainable by coagulation of an aqueous dispersion containing the modified polytetrafluoroethylene and the polytetrafluoroethylene homopolymer.

Another aspect of the present invention is a polytetrafluoroethylene porous membrane obtainable by stretching the polytetrafluoroethylene mixture.

Advantageous Effects of Invention

The polytetrafluoroethylene mixture of the present invention with the above (formulations)/embodiments can be easily biaxially oriented, stretched while maintaining homogeneous membrane appearance even with a high draw ratio, and formed into a polytetrafluoroethylene porous membrane with low pressure loss. The polytetrafluoroethylene porous membrane of the present invention is produced by stretching the polytetrafluoroethylene mixture, and therefore has good membrane appearance and low pressure loss.

DESCRIPTION OF EMBODIMENTS

Figure 1:
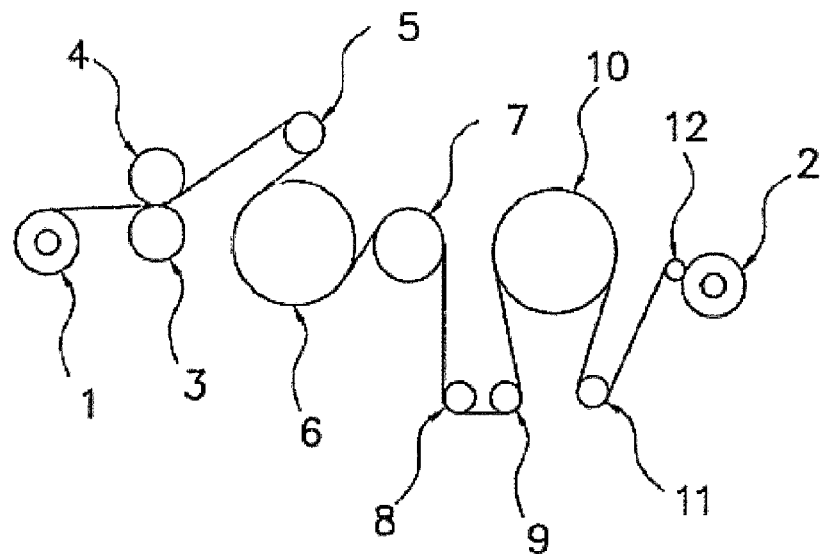
FIG. 1 is a schematic cross-sectional view showing an outline of a roll stretching apparatus used in examples.

The polytetrafluoroethylene mixture (hereinafter, also referred to as a "PTFE mixture") of the present invention is a mixture of a modified polytetrafluoroethylene (hereinafter, also referred to as a "modified PTFE") with a polytetrafluoroethylene homopolymer (hereinafter, also referred to as a "homo-PTFE").

In the PTFE mixture of the present invention, the mass ratio of the modified PTFE to the homo-PTFE, that is, modified PTFE/homo-PTFE, is preferably 10 to 90/90 to 10. In order to reduce pressure loss, the modified PTFE/homo-PTFE is more preferably 20 to 80/80 to 20 and still more preferably 50 to 80/50 to 20. Too large a proportion of the modified PTFE may cause difficulty in uniform stretching. On the other hand, too small a proportion of the modified PTFE may cause an increase in the pressure loss of the PTFE porous membrane obtained from the PTFE mixture of the present invention.

The modified PTFE is preferably not melt-processible. Also, the modified PTFE alone is preferably less likely to be stretched with a high draw ratio.

The modified PTFE includes tetrafluoroethylene [TFE] and monomers (hereinafter, also referred to as a "modified monomer") other than TFE.

The modified PTFE is preferably produced without being intentionary modified using monomers other than TFE or a chain transfer agent in the later stages of the polymerization, particularly at the end of the polymerization, in order to reduce extrusion pressure during the paste extrusion.

Examples of the modified PTFE include modified PTFEs disclosed in JP 60-076516 A, JP 64-1711 A, and JP 10-053624 A.

The modified PTFE includes a TFE unit derived from TFE and a modified monomer unit derived from a modified monomer. The modified PTFE preferably includes a modified monomer unit in an amount of 0.005 to 0.500 wt %, and more preferably 0.02 to 0.30 wt % of the weight of all monomer units. The modified monomer unit, herein, means a portion of the molecular structure of the modified PTFE. The portion is derived from a modified monomer. The all monomer units, herein, mean all portions derived from monomers in the molecular structure of the modified PTFE.

The modified PTFE has a cylinder extrusion pressure, at a reduction ratio of 1600 (RR1600), of 70 MPa or higher, and preferably has a cylinder extrusion pressure, at a reduction ratio of 1600, of 80 MPa or higher. The upper limit of the extrusion pressure is not particularly limited, and may be high to the extent that the modified PTFE cannot be extruded from an extruder and the pressure exceeds the limit of measurement. For example, the upper limit may be 110 MPa. Use of the modified PTFE with a cylinder extrusion pressure, at a reduction ratio of 1600, of 70 MPa or higher provides a polytetrafluoroethylene porous membrane with low pressure loss, easily biaxially oriented, and stretched while maintaining homogeneous membrane appearance even with a high draw ratio. Further, a formed product such as the PTFE porous membrane obtained from the PTFE mixture of the present invention is made to have excellent homogeneity.

The cylinder extrusion pressure at a reduction ratio of 1600 is measured in accordance with ASTM D 4895. A specific measurement method is as follows: a PTFE in powder form (50 g) and hydrocarbon oil (tradename: Isopar G (registered trademark), product of Exxon) (10.25 g) as an extrusion aid are mixed for 3 minutes in a glass bottle; the mixture is aged for one hour at room temperature (25±2° C.); the mixture is packed in an extrusion die (having an orifice (orifice diameter of 0.65 mm, orifice length of 2 mm), which has a squeezing angle of 30 degrees, at its lower end) equipped with a cylinder (inside diameter of 25.4 mm); a load of 1.2 MPa is applied to a piston inserted into the cylinder, and the load is held for 1 minute; and the mixture is immediately extruded from the orifice at a ram speed of 20 ram/min at room temperature to prepare a rod-like article. The extrusion pressure is the pressure in the equilibrium state in the later stage of the extrusion divided by the cross-sectional area of the cylinder.

The modified PTFE preferably has a cylinder extrusion pressure, at a reduction ratio 100 (RR100), of 5 MPa or higher and more preferably 8 MPa or higher. The cylinder extrusion pressure at a reduction ratio of 100 is preferably 15 MPa or lower.

The cylinder extrusion pressure at a reduction ratio of 100 is measured by the following way. A PTFE in powder form (100 g) is previously allowed to stand at room temperature for at least 2 hours. The PTFE in powder form and hydrocarbon oil (tradename: Isopar H (registered trademark), product of Exxon) (21.7 g) as an extrusion aid are placed in a 900-cc glass bottle, and after 3 minutes of blending, the mixture is allowed to stand in a constant-temperature vessel at 25° C. for 2 hours. The resulting mixture is paste-extruded through an orifice (diameter of 2.5 cm, land length of 1.1 cm, introduction angle of 30°) under the conditions of a reduction ratio of 100, an extrusion speed of 51 cm/min, and a temperature of 25° C. Thus, a bead (extrudate) is prepared. A cylinder extrusion pressure at a reduction ratio of 100 is a load at extrusion in the equilibrium state in this paste extrusion divided by the cross-section area of the cylinder used.

The modified PTFE preferably has a standard specific gravity [SSG] of 2.130 to 2.230, more preferably has a SSG of 2.130 to 2.185, and still more preferably has a SSG of 2.140 to 2.180. Too high a SSG of the modified PTFE may cause difficulty in uniform stretching. Too low a SSG of the modified PTFE may cause an increase in pressure loss.

The SSG of the modified PTFE is preferably 2.170 or lower and more preferably 2.165 or lower in view of uniform stretching.

The SSG is measured in accordance with ASTM D 4895.

The modified PTFE preferably has a peak top (DSC melting point) in the range of 333 to 345° C. in a heat-of-fusion curve of a modified PTFE having no history of being heated to a temperature of 300° C. or higher. The heat-of-fusion curve is constructed using a differential scanning calorimeter at a temperature increase rate of 10° C./min. The modified PTFE more preferably has a peak top in the range of 333° C. or higher and lower than 340° C. in the curve. If the modified PTFE has a high DSC melting point, the pressure loss may be increased.

Specifically, the differential scanning calorimetry [DSC] is performed, for example, in such a way that RDC 220 (product of SII Nanotechnology Inc.) is temperature-calibrated beforehand using indium and lead as a standard sample, about 3 mg of a PTFE in powder form is placed in an aluminum pan (crimped container), and the temperature is raised at a rate of 10° C./min from 250 to 380° C. in an air current having a flow rate of 200 mL/min. Indium, lead, and tin are used as the standard sample for heat quantity calibration, and the aluminum pan is used as a measurement reference in an empty and sealed condition. The obtained heat-of-fusion curve is analyzed using Muse standard analysis software (product of SII NanoTechnology) to determine a temperature indicating the peak top of the quantity of heat of fusion as a DSC melting point.

The modified PTFE preferably has an average primary particle size of 0.05 to 0.5 μm. The average primary particle size is determined as follows: A standard curve of the transmittance of 550-nm incident light through a unit length of an aqueous dispersion adjusted to a polymer concentration of 0.22% by mass versus an average primary particle size determined by measuring the particle diameter in a certain specific direction on a transmission electron micrograph was constructed. The above transmittance through the aqueous dispersion to be assayed was measured, and the average primary particle size was determined based on the standard curve.

The modified PTFE preferably has a specific surface area of 6 to 20 m²/g. The specific surface area in such a range is the usual specific surface area of a PTFE obtained by emulsion polymerization. The specific surface area is measured by a BET method using a surface analyzer.

Examples of the modified monomer include, but are not particularly limited to, as long as they are copolymerizable with TFE, perfluoroolefins such as hexafluoropropylene [HFP]; chlorofluoroolefins such as chlorotrifluoroethylene [CTFE]; hydrogen-containing fluoroolefins such as trifluoroethylene and vinylidene fluoride [VDF]; perfluorovinyl ethers; perfluoroalkyl ethylenes; and ethylene. The modified monomers may be used alone or some of the monomers may be used in combination.

Examples of the perfluorovinyl ethers include, but are not particularly limited to, perfluoro unsaturated compounds represented by the formula (I):

(wherein Rf is a perfluoro organic group). The term "perfluoro organic group", herein, means an organic group in which all the hydrogen atoms bonded to carbon atoms are substituted with fluorine atoms. The perfluoro organic group may have ether oxygen.

Examples of the perfluorovinyl ether include perfluoro (alkyl vinyl ethers) [PAVEs] represented by the formula (I) where Rf is a C1-C10 perfluoroalkyl group. The perfluoroalkyl group preferably contains 1 to 5 carbons.

Examples of the perfluoroalkyl group in the PAVE include perfluoromethyl, perfluoroethyl, perfluoropropyl, perfluorobutyl, perfluoropentyl, and perfluorohexyl groups. Perfluoropropyl vinyl ether [PPVE], in which the perfluoroalkyl group is a perfluoropropyl group, is preferred.

Examples of the perfluorovinyl ether further include one represented by the formula (I) where Rf is a C4-C9 perfluoro (alkoxyalkyl) group; one represented by the formula (I) where Rf is a group represented by the following formula:

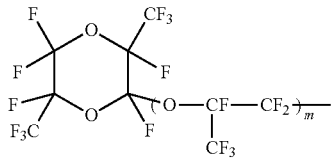

[Chem. 1]

(wherein m is 0 or an integer of 1 to 4); and one represented by the formula (I) where Rf is a group represented by the following formula:

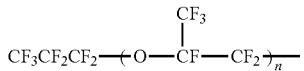

[Chem. 2]

(wherein n represents an integer of 1 to 4).

Examples of the perfluoroalkyl ethylenes (PFAEs) include, but are not particularly limited to, perfluorobutyl ethylene (PFBE) and perfluorohexyl ethylene.

The modified monomer in the modified PTFE is preferably at least one monomer selected from the group consisting of HFP, CTFE, VDF, PAVE, PFAE and ethylene, more preferably PAVE, and still more preferably PPVE.

The homo-PTFE is substantially composed only of a TFE unit, and is, for example, preferably one prepared using no modified monomer.

The homo-PTFE is fibrillable. The fibrillable homo-PTFE can be formed into a seamless extrudate (extruded strand) by paste extrusion. Whether the homo-PTFE is fibrillable or not is determined by "paste extrusion", which is a typical method of forming a "PTFE in powder form" into an extrudate. The PTFE in powder form is powder prepared from a TFE polymer. Generally, paste extrusion is carried out because of the fibrillability of a polymer PTFE. An unsintered formed product obtained by paste extrusion substantially having no strength or being not stretched, for example, a formed product having a percentage of stretch of 0% and being broken by stretch, is considered to be free of fibrillability. A non-fibrillable homo-PTFE may cause an increase in pressure loss of a porous membrane. Further, the homo-PTFE is not melt-processible.

The homo-PTFE preferably has a standard specific gravity [SSG] of 2.130 to 2.230, more preferably has a SSG of 2.130 to 2.190, and still more preferably has a SSG of 2.140 to 2.170. If the SSG is too low, the porous membrane may be less likely to be rolled to deteriorate its homogeneity, whereby the pressure loss of the porous membrane may be increased. If the SSG is too high, the porous membrane may be less likely to be uniformly stretched.

The homo-PTFE preferably has a peak top (DSC melting point) in the range of 335 to 347° C. in a heat-of-fusion curve of a homo-PTFE having no history of being heated to a temperature of 300° C. or higher. The heat-of-fusion curve is constructed using a differential scanning calorimeter at a temperature increase rate of 10° C./min. The homo-PTFE more preferably has a peak top in the range of 340 to 347° C. in the curve. A homo-PTFE with a low DSC melting point may be less likely to be uniformly stretched. Specifically, the DSC melting point of the homo-PTFE may be measured in the same manner as for the modified PTFE.

The homo-PTFE preferably has an average primary particle size of 0.05 to 0.5 The average primary particle size may be measured in the same manner as for the modified PTFE.

The homo-PTFE preferably has a cylinder extrusion pressure, at a reduction ratio of 100, of 10 to 35 MPa, and more preferably has a cylinder extrusion pressure, at a reduction ratio of 100, of 10 to 20 MPa. Too large a cylinder extrusion pressure at a reduction ratio of 100 may cause an increase in pressure loss of the porous membrane. On the other hand, too small an extrusion pressure to a cylinder may cause difficulty in uniform stretching. The cylinder extrusion pressure at a reduction ratio of 100 can be measured in the same manner as for the modified PTFE.

The stress relaxation time for the homo-PTFE is preferably 150 seconds or more, and more preferably 300 seconds or more. The bead (extrudate) prepared in the measurement of the paste extrusion pressure at a reduction ratio of 100 is cut to an appropriate length, each end of the bead piece is clamped to give a clamp distance of 38 mm, the piece is heated to 300° C. in a circulating-air oven and then stretched with a total draw ratio of 2400% by stretching the clamps apart at a stretching speed of 1000%/sec. Thus, a stretched article a2 is prepared. The stretched article a2 (total length of 25 cm) is fixed in a taut condition on a fixing means and allowed to stand in an oven at a temperature of 390° C. The time from the start of the standing till the stretched article a2 breaks is determined as stress relaxation time. The stretched article a2 on the fixing means is inserted into the oven through a (covered) slot at the side of the oven. Therefore, the temperature in the oven does not drop during disposition of the stretched article a2 into the oven. Accordingly, such a certain period of time as disclosed in U.S. Pat. No. 4,576,869 is not required for temperature recovery.

The strength at break of the homo-PTFE is preferably 5 to 50 N and more preferably 10 to 25 N. Further, the strength at break is preferably 10 N or higher and lower than 25 N. The strength at break is determined in the following way. A PTFE in powder form (100 g) is previously allowed to stand at room temperature for at least 2 hours The PTFE in powder form and hydrocarbon oil (tradename: Isopar H (registered trademark), product of Exxon) (21.7 g) as an extrusion aid are placed in a 900-cc glass bottle, and after 3 minutes of blending, the mixture is allowed to stand in a constant-temperature vessel at 25° C. for 2 hours. The resulting mixture is paste-extruded through an orifice (diameter of 2.5 cm, land length of 1.1 cm, introduction angle of 30°) under the conditions of a reduction ratio of 100, an extrusion speed of 51 cm/min, and a temperature of 25° C. Thus, a bead (extrudate) is prepared. The bead is cut to an appropriate length, each end of the bead piece is clamped to give a clamp distance of 51 mm, the piece is heated to 300° C. in a circulating-air oven and then stretched with a total draw ratio of 24 by stretching the clamps apart at a stretching speed of 100%/sec to prepare a stretched article a1. The resulting stretched article a1 is stretched at room temperature at a speed of 300 mm/min using a tensile tester (trademark: AGS-500D, product of Shimadzu) to determine the strength at break.

The homo-PTFE preferably has a specific surface area of 6 to 20 $m^2/g$. The specific surface area in such a range is the usual specific surface area of a PTFE obtained by emulsion polymerization. The specific surface area is measured in accordance with a BET method using a surface analyzer.

The PTFE mixture of the present invention preferably contains a modified monomer unit of 0.001 to 0.450% by mass of the mass of all monomer units constituting all polymers in the mixture.

The PTFE mixture of the present invention preferably has a standard specific gravity [SSG] of 2.130 to 2.190, and more preferably 2.140 to 2.170. Further, the SSG is preferably 2.159 or lower.

The PTFE mixture of the present invention preferably has a cylinder extrusion pressure, at a reduction ratio of 100, of 10 to 20 MPa, and more preferably 12.0 MPa or higher. The cylinder extrusion pressure at a reduction ratio of 100 is measured in the same manner as that for the cylinder extrusion pressure at a reduction ratio of 100 of the modified PTFE.

The strength at break of the PTFE mixture of the present invention is preferably 5 to 15 N. The PTFE mixture with the strength at break in such an appropriate range can be uniformly stretched and formed into a PTFE porous membrane with low pressure loss.

The stress relaxation time for the PTFE mixture of the present invention is preferably 100 to 600 seconds. The stress relaxation time may be measured in the same manner as for the homo-PTFE.

The modified PTFE and homo-PTFE are preferably prepared by emulsion polymerization because they can be easily biaxially oriented, homogeneously stretched even with a high draw ratio, and formed into a PTFE porous membrane with low pressure loss.

The PTFE mixture of the present invention may include not only the modified PTFE and homo-PTFE, but also known additives and the like. For example, in cases where the PTFE mixture of the present invention is used as a material for a PTFE porous membrane, the PTFE mixture preferably includes carbon materials such as carbon nanotube and carbon black, pigments, photocatalysts, activated carbon, antibacteria agents, adsorbents, and deodorizers.

The PTFE mixture of the present invention may be produced by various methods. For example, in order to prepare a PTFE mixture in mixed powder form, a method of mixing the modified PTFE in powder form with the homo-PTFE in powder form using a common mixer and the like, and a method of co-coagulating an aqueous dispersion including the modified PTFE and the homo-PTFE may be used.

In order to uniformly disperse the modified PTFE and the homo-PTFE and prepare a porous membrane with little variation of the pressure loss, a method of coagulating an aqueous dispersion containing the modified PTFE and the homo-PTFE, i.e., a method of co-coagulating the modified PTFE and the homo-PTFE is preferably used. The variation of the pressure loss of the PTFE porous membrane is represented, for example, by a coefficient of variation of the pressure loss. If the variation of the pressure loss is small, a coefficient of variation of the pressure loss becomes small. On the other hand, if the variation of pressure loss is large, pores of the membrane may vary in size. Such a membrane is considered as a heterogeneous membrane in comparison to a membrane with a small coefficient of variation of the pressure loss.

Examples of the method of the co-coagulation include: (i) a method including mixing an aqueous dispersion of the modified PTFE and an aqueous dispersion of the homo-PTFE and coagulating the mixture; (ii) a method including adding the modified PTFE in powder form to an aqueous dispersion of the homo-PTFE and coagulating the mixture; and (iii) a method including adding the homo-PTFE in powder form to an aqueous dispersion of the modified PTFE.

Among these co-coagulation methods, the method (i) is preferable because it is likely to achieve uniform dispersion.

The co-coagulation is preferably carried out by adding acids such as nitric acid, hydrochloric acid, and sulfuric acid; and metal salts such as magnesium chloride, calcium chloride, sodium chloride, aluminium sulfate, magnesium sulfate, and barium sulfate.

The PTFE mixture of the present invention can be formed into a PTFE porous membrane. Another aspect of the present invention is a polytetrafluoroethylene porous membrane obtainable by stretching the PTFE mixture. The PTFE porous membrane of the present invention including the PTFE mixture has excellent appearance and low pressure loss. Further, the membrane is highly uniform.

The thickness of the PTFE porous membrane is preferably 5 µm or larger, more preferably 10 µm or larger, and still more preferably 20 µm or larger. Too small a thickness may cause a reduction in mechanical strength. The upper limit of the thickness of the membrane is not particularly limited, and for example, is 100 µm.

The PTFE porous membrane may be produced by any method, and may be produced by known methods. For example, the PTFE porous membrane may be produced as follows: a liquid lubricant such as solvent naphtha and white oil is added to the PTFE mixture; the mixture is paste extruded into a rod-like form; the rod-like paste extrudate is rolled to prepare an unsintered PTFE article (unsintered PTFE tape); and the unsintered PTFE tape is stretched.

The PTFE mixture of the present invention and a porous membrane prepared from the mixture are used, for example, in the following fields.

Field of Electrochemical

Dielectric prepreg materials, EMI shielding materials, heat transfer materials, and the like. Specifically, printed-circuit boards, electromagnetic shielding materials, insulation heat transfer materials, insulation materials, and the like.

Field of Sealing Material

Gaskets, packings, pump diaphragms, pump tubes, sealing materials for aircrafts, and the like.

Field of Air Filtration

ULPA filters (for semiconductor manufacturing), HEPA filters (for hospitals and semiconductor manufacturing), cylindrical cartridge filters (for industrial use), bag filters (for industrial use), heat-resistant bag filters (for exhaust gas treatment), heat-resistant pleat filters (for exhaust gas treatment), SINBRAN filters (for industrial use), catalyst filters (for exhaust gas treatment), adsorbent-coated filters (for HDD integration), adsorbent-coated vent filters (for HDD integration), vent filters (for HDD integration or the like), filters for cleaners (for cleaners), general-purpose multi-layered felt materials, cartridge filters for GTs (for compatible articles for GTs), cooling filters (for cases of electric devices), and the like.

Field of Ventilation/Internal Pressure Adjustment

Materials for freeze-drying of, for example, containers for freeze-drying, ventilation materials for vehicles for electronic circuits or lamps, caps of containers, protection ventilation for electric devices, ventilation for medical use, and the like.

Field of Liquid Filtration

Liquid filtration filters for semiconductors (for semiconductor manufacturing), hydrophilic PTFE filters (for semiconductor manufacturing), filters for chemicals (for treatment of chemicals), filters for pure water production lines (for pure water production), back wash type liquid filtration filters (for treatment of industrial effluent), and the like.

Field of General Consumer Goods

Clothing (for clothing for consumer), cable guides (movable wires for motorbikes), clothing for motorbikes (for clothing for consumer), cast liners (medical supporter), filters for cleaners, bagpipes (musical instruments), cables (signal cables for guitars and the like), bowstrings (for stringed instruments), and the like.

Field of Fibers

PTFE fibers (fibrous materials), sewing threads (textiles), weaving yarn (textiles), ropes, and the like.

Medical Field

Articles to be buried in a body (extension article), artificial blood vessels, catheters, general operations (reinforcements for tissues), and products for head and neck (dural repair), health in a mouth (tissue regeneration medicine), orthopedics (bandages), and the like.

The PTFE porous membrane of the present invention is particularly useful as filtering mediums for ULPA filters, HEPA filters, and various medium-performance air filters because the membrane has low pressure loss.

The PTFE porous membrane of the present invention may be used alone when used as filtering mediums for air filters. In order to improve handling, at least one face of the PTFE porous membrane is preferably supported with a breathable support material. The breathable support material supports a porous membrane, and preferably adheres to the porous membrane. The support material may be any material as long as it is breathable and supports a porous membrane, and is preferably nonwoven fabrics.

Examples of the nonwoven fabrics include: nonwoven fabrics of polyethylene terephthalate (PET) fibers, nonwoven fabrics of polybutylene terephthalate (PBT) fibers, nonwoven fabrics with a sheath-core structure in which a core constituent is PET and a sheath constituent is polyethylene (PE) (PET/PE core/sheath nonwoven fabric), nonwoven fabrics with a sheath-core structure in which a core constituent is PET and a sheath constituent is PBT (PET/PBT core/sheath nonwoven fabric), nonwoven fabrics with a sheath-core structure in which a core constituent is PET with a high melting point and a sheath constituent is PET with a low melting point (PET with a high melting point/PET core with low melting point/sheath nonwoven fabric), nonwoven fabrics formed of composite fibers of PET fibers and PBT fibers, and nonwoven fabrics formed of composite fibers of PET fibers with a high melting point and PET fibers with a low melting point. The support material is preferably highly breathable and has low pressure loss so that the effects of the present invention are not impaired.

As described above, the performance of the filtering medium is primarily derived from the performance of a porous membrane of a polytetrafluoroethylene. The filtering medium can sufficiently catch a great deal of dust without using a support material having a prefiltering function. In order to increase the dust catching capacity, melt blown nonwoven fabrics or the like may be used as a support material.

The diameter of the pore of the support material is preferably larger than that of the polytetrafluoroethylene porous membrane. The areal weight of the nonwoven fabric used for the support material is usually 10 to 600 $g/m^2$, preferably 15 to 300 $g/m^2$, and more preferably 15 to 100 $g/m^2$. The thickness of the nonwoven fabric used for the support material is preferably 0.10 to 0.52 mm. In order to secure the dust catching capacity, a breathable support material with a high dust catching capacity (a known means for securing a dust catching capacity disclosed, for example, in JP 2000-300921 A, JP 2008-525692 T, and U.S. Pat. No. 6,808,553) may be placed upstream of an air current.

The PTFE mixture of the present invention is preferably a stretchable material. The present invention also includes use of the PTFE mixture of the present invention for producing a PTFE porous membrane. The present invention also includes a method of producing a polytetrafluoroethylene porous membrane, including a process of stretching the mixture of the present invention.

In cases where the modified PTFE is a non-melt processable modified PTFE (A) prepared by emulsion polymerization of TFE, and the homo-PTFE is a non-melt processable and fibrillable homo-PTFE (B) prepared by emulsion polymerization of TFE, the PTFE mixture of the present invention preferably further includes a non-melt processable PTFE (C) prepared by suspension polymerization of TFE.

EXAMPLES

The present invention is described in more detail below with reference to examples, but is not limited only to these examples.

The data in examples is obtained by the following measurement methods.

Standard Specific Gravity (SSG)

A SSG was measured in accordance with ASTM D 4895.

Concentration of Polymer (Solids Content) in Aqueous Dispersion

Concentration P (%) of a polymer in an aqueous dispersion was determined by the formula: $P=Z/X \times 100(\%)$, where X (g) was an amount of the aqueous dispersion, and Z (g) was an amount of an ignition residue obtained by heating the aqueous dispersion for 3 hours at 150° C.

Average Primary Particle Size

A standard curve of the transmittance of 550-nm incident light through a unit length of an aqueous dispersion adjusted to a polymer concentration of 0.22% by mass versus an average primary particle size determined by measuring the particle diameter in a certain specific direction on a transmission electron micrograph was constructed. The above transmittance through the aqueous dispersion to be assayed was measured, and the average primary particle size was determined based on the standard curve.

Modification (Amount of Modified Monomer Unit)

In Preparation Examples 1 and 3, the perfluoro propyl vinyl ether modification in a polymer (wt %) was calculated by the method disclosed in JP 2005-298581 A. Specifically, the modification was the ratio of an absorption value at 995 $cm^{-1}$ to an absorption value at 935 $cm^{-1}$ in an infrared absorption spectral band of a sample polymer multiplied by 0.14.

In Preparation Example 4, the perfluoro propyl vinyl ether modification and the hexafluoropropylene modification (wt %) in a polymer were determined by nuclear magnetic resonance spectrum measurement.

Paste Extrusion Pressure at RR100

A PTFE in fine powder form (100 g) which was allowed to stand at room temperature for at least 2 hours and hydrocarbon oil (tradename: Isopar H (registered trademark), product of Exxon) (21.7 g) as an extrusion aid were placed in a 900-cc glass bottle, and after 3 minutes of blending, the mixture was allowed to stand in a constant-temperature vessel at 25° C. for 2 hours. The resulting mixture was paste-extruded through an orifice (diameter of 2.5 cm, land length of 1.1 cm, introduction angle of 30°) under the conditions of a reduction ratio of 100, an extrusion speed of 51 cm/min, and a temperature of 25° C. Thus, a bead (extrudate) was prepared. The extrusion pressure was defined as a load at extrusion in the equilibrium state in this paste extrusion divided by the cross-sectional area of the cylinder used.

Strength at Break

The bead (extrudate) prepared in the measurement of the paste extrusion pressure at RR100 was cut to an appropriate length, each end of the bead piece was clamped to give a clamp distance of 51 mm, the piece was heated to 300° C. in a circulating-air oven and then stretched with a total draw ratio of 24 by stretching the clamps apart at a stretching speed of 100%/sec to prepare a stretched article a1. The resulting stretched article a1 was stretched at room temperature at a speed of 300 mm/min using a tensile tester (trademark: AGS-500D, product of Shimadzu) to determine the strength at break. In Table 1, the results of the strength at break represented by "unmeasurable" mean that a bead was broken during stretching.

Stress Relaxation Time

The bead (extrudate) prepared in the measurement of the paste extrusion pressure at RR100 was cut to an appropriate length, each end of the bead piece was clamped to give a clamp distance of 38 mm, the piece was heated to 300° C. in a circulating-air oven and then stretched with a total draw ratio of 2400% by stretching the clamps apart at a stretching speed of 1000%/sec. Thus, a stretched article a2 was prepared. The stretched article a2 (total length of 25 cm) was fixed in a taut condition on a fixing means and allowed to stand in an oven at a temperature of 390° C. The time from the start of the standing till the stretched article a2 breaks was determined as stress relaxation time. The stretched article a2 on the fixing means was inserted into the oven through a (covered) slot at the side of the oven. Therefore, the temperature in the oven does not drop during disposition of the stretched article a2 into the oven. Accordingly, such a certain period of time as disclosed in U.S. Pat. No. 4,576,869 was not required for temperature recovery. In Table 1, the stress relaxation time represented by "unmeasurable" mean that measurement could not be performed because a bead was broken during stretching.

Paste Extrusion Pressure at RR1600

A paste extrusion pressure at RR1600 was measured in accordance with ASTM D 4895.

A PTFE in powder form (50 g) and hydrocarbon oil (tradename: Isopar H (registered trademark), product of Exxon) (10.25 g) as an extrusion aid were mixed for 3 minutes in a glass bottle, and the mixture was aged for one hour at room temperature (25±2° C.). The mixture was packed in an extrusion die (having an orifice (orifice diameter of 0.65 mm, orifice length of 2 mm), which has a squeezing angle of 30 degrees, at its lower end) equipped with a cylinder (inside diameter of 25.4 mm); 1.2 MPa of a load was applied to a piston inserted into the cylinder, and the load is held for 1 minute. The mixture was immediately extruded from the orifice at a ram speed of 20 mm/min at room temperature to prepare a rod-like article. The extrusion pressure was defined as a pressure in the equilibrium state in the later stage of the extrusion divided by the cross-sectional area of the cylinder.

Evaluation of Membrane Appearance

The PTFE sheet prepared by the method (1) described below was stretched with a draw ratio of 5 in the machine direction and 36 in the transverse direction by the method (2) described below. The appearance of the resulting stretched sheet (PTFE porous membrane) was visually observed and evaluated.

(1) Preparation of PTFE Sheet

A PTFE in powder form (3 kg) and an extrusion aid (trademark: Isopar M, product of Exxon) (780 g) were placed in a 15-L plastic bottle and mixed for 20 minutes at 100 rpm. The mixture was allowed to stand in an oven at 40° C. for 12 hours for sufficient penetration of the extrusion aid.

Then, the PTFE in powder form mixed with the extrusion aid was fed to a preforming machine (100 φmm), and after arrival of the pressure at 3 MPa, the pressure was retained for 10 minutes to give a preform. The preform was fed to an extruder (inside diameter of 100 mm) equipped with a die (inside diameter of 16 mm φ) set at 50° C. in advance, and extruded. Further, the extrudate was rolled with a 400 mm φ pressure roll heated at 60° C. to give a 200-μm-thick sheet. The resulting sheet was heated to 180° C. to completely eliminate the extrusion aid to prepare a PTFE sheet.

(2) Method of Stretching

The above PTFE sheet was stretched using a stretching apparatus equipped with a plurality of rolls as shown in FIG. 1 in such a way that the PTFE sheet was fed from an unwind roll 1 of an unsintered film under the conditions of a feed speed of 1.0 m/min, a final take-up speed of 5 m/min, and a temperature of 250° C. The PTFE sheet was stretched with a draw ratio of 5 in the machine direction.

Figure 2:
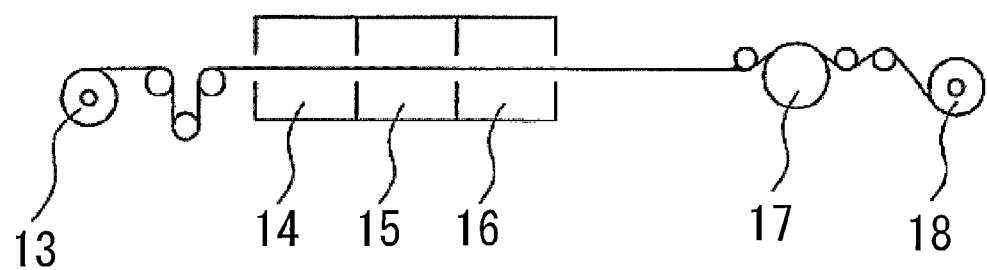
FIG. 2 is a schematic cross-sectional view showing a tentering apparatus used in examples.

The resulting 5-fold stretched sheet was stretched using a device (tenter) with continuous clips to hold the sheet shown in the left side of FIG. 2. The sheet was stretched with a draw ratio of 36 in the transverse direction. The resulting sheet was heat-set to give a PTFE porous membrane. The stretching temperature was 220° C., the heat setting temperature was 360° C., and the stretching speed was 500%/sec.

The evaluation criteria are as follows:
Very good: uniform
Good: uniform (but partially uneven)
Acceptable: considerably uneven
Poor: partially broken
Very poor: broken (completely broken)
Thickness of PTFE porous membrane The thickness of a PTFE porous membrane was determined using a thickness gauge (1D-110 MH type, product of Mitutoyo Corporation). Five PTFE porous membranes stretched with a draw ratio of 5 in the machine direction and 36 in the transverse direction were stacked, and the thickness of one PTFE porous membrane was expressed as the value of the thickness of the five membranes divided by 5.

Pressure Loss

The PTFE porous membrane stretched with a draw ratio of 5 in the machine direction and 36 in the transverse direction was set on a filter holder with a diameter of 100 mm. A pressure was applied to the entrance side using a compressor, and the flow rate of the air transmitting the membrane was adjusted to 5.3 cm/sec using a flow velocimeter. The pressure loss was determined as the average of the pressure losses that were measured on different 100 points selected, using a manometer.

Coefficient of Variation of Pressure Loss

A standard deviation was determined from the pressure losses of the 100 points, and a coefficient of variation of the pressure loss was calculated by the equation 1 based on the average of the pressure losses.

Coefficient of variation of pressure loss (%)=(standard deviation of pressure losses of 100 points)/(average of pressure losses of 100 points)×100     Equation 1

Preparation Example 1

Preparation Example 1 was performed in accordance with the method disclosed in Comparative Example 1 in JP 10-53624 A.

A 6-L stainless steel (SUS316) autoclave equipped with a stainless steel (SUS316) anchor-shaped agitation blade and a jacket for temperature control was charged with deionized water (2980 ml), paraffin wax (120 g), and ammonium perfluorooctanoate (3.0 g), and the system was purged with nitrogen gas three times and with TFE twice to remove oxygen, while the system was heated to 70° C. Then, the internal pressure was set to 1.15 MPa by TFE, the contents were stirred at 280 rpm, and the internal temperature was kept at 70° C.

Next, perfluoro propyl vinyl ether (PPVE) (6.0 g) was injected along with TFE into the autoclave followed by an aqueous solution of ammonium persulfate (30 mg) in deionized water (20 ml). The internal pressure of the autoclave was kept at 1.20 MPa, the reaction temperature was kept at 70° C., and the stirring speed was kept at 280 rpm. TFE was successively supplied so that the internal pressure of the autoclave was constantly kept at 1.20±0.05 MPa.

After 1290 g of TFE was consumed, the stirring and the monomer supply were stopped, the gas in the autoclave was immediately discharged so that the pressure was reduced to ordinary pressure, and the reaction was terminated. Thus, an aqueous dispersion A of the modified PTFE was prepared. The resulting aqueous dispersion had a polymer concentration of 30.1 wt % and an average primary particle size of 0.18 μm.

A 6-L stainless steel (SUS316) coagulation vessel equipped with a stainless steel (SUS316) agitation blade, a baffle plate, and a jacket for temperature control was charged with the PTFE aqueous dispersion A (3 L) in which paraffins were removed by filtration and the polymer concentration was adjusted to 14 wt % by dilution with deionized water.

The temperature of the contents was controlled to 20° C. and the stirring was then started (450 rpm). At this time, a 10 wt % aqueous ammonium hydrogen carbonate solution (3 g) was added into the coagulation vessel as a neutralizer. After the mixture was separated into polymer powder and water, the stirring was stopped. The resulting wet powder was subjected to filtration, and freshly washed with deionized water (3 L). This washing operation was repeated twice and the resultant was dried in a hot-air circulation oven at 160° C. for 18 hours to prepare fine powder A of the modified PTFE (PPVE modification: 0.15 wt %, SSG: 2.158, paste extrusion pressure at RR1600: 85 MPa).

Preparation Example 2

Preparation Example 2 was performed in accordance with the method disclosed in Example 4 in JP 58-39443 B.

The same autoclave as that used in Preparation Example 1 was charged with deionized water (2980 ml), paraffin wax (120 g), and ammonium perfluorooctanoate (3.0 g), and the system was purged with nitrogen gas three times and with TFE twice to remove oxygen, while the system was heated to 70° C. Then, the internal pressure was set to 0.85 MPa by TFE, the contents were stirred at 250 rpm, and the internal temperature was kept at 70° C.

Next, an aqueous solution of ammonium persulfate (18 mg) in deionized water (20 ml) was injected along with TFE into the autoclave. The internal pressure of the autoclave was kept at 0.8 MPa, the reaction temperature was kept at 70° C., and the stirring speed was kept at 250 rpm. TFE was successively supplied so that the internal pressure of the autoclave was constantly kept at 0.09±0.05 MPa.

After 378 g of TFE was consumed, an aqueous solution of hydroquinone (12 mg) in deionized water (20 ml) was injected along with TFE, and the reaction was continued.

After 900 g of TFE was consumed, the stirring and the monomer supply were stopped, the gas in the autoclave was immediately discharged so that the pressure was reduced to ordinary pressure, and the reaction was terminated. Thus, an aqueous dispersion B of the homo-PTFE was prepared. The resulting aqueous dispersion had a polymer concentration of 23.0 wt % and an average primary particle size of 0.33 μm.

The same coagulation vessel as that used in Preparation Example 1 was charged with the PTFE aqueous dispersion B (3 L) in which paraffins were removed by filtration and the polymer concentration was adjusted to 14 wt % by dilution with deionized water.

The temperature of the contents was controlled to 20° C. and the stirring was then started (450 rpm). At this time, nitric acid (1 ml) was added into the coagulation vessel as a coagulant. After the mixture was separated into polymer powder and water, the stirring was stopped. The resulting wet powder was subjected to filtration, and washed and dried as in Preparation Example 1 to prepare fine powder B of the homo-PTFE (SSG: 2.160, paste extrusion cannot be carried out at RR1600, paste extrusion pressure at RR100: 14.3 MPa).

Example 1

Fine powder A (2.1 kg) of the modified PTFE and fine powder B (0.9 kg) of the homo-PTFE were placed in a 15-L plastic bottle, and mixed using a tumbler mixer for 5 minutes. Thus, a mixture of the fine powder of the modified PTFE with the fine powder of the homo-PTFE was prepared. Various measurements and evaluations were performed on the resulting fine powder mixture.

Example 2

The same coagulation vessel as that used in Preparation Example 1 was charged with the aqueous dispersion A (2.1 L) of the modified PTFE in which paraffins were removed by filtration and the polymer concentration was adjusted to 14 wt % by dilution with deionized water, and the aqueous dispersion B (0.9 L) of the homo-PTFE in which paraffins were removed by filtration.

The temperature of the contents was controlled to 20° C. and the stirring was then started (450 rpm). At this time, a 10 wt % aqueous ammonium hydrogen carbonate solution (3 g) was added into the coagulation vessel as a neutralizer. After the mixture was separated into polymer powder and water, the stirring was stopped. The resulting wet powder was subjected to filtration, and washed and dried as in Preparation Example 1 to prepare fine powder composed of the modified PTFE and the homo-PTFE.

Various measurements and evaluations were performed on the resulting fine powder as in Example 1.

Examples 3 and 4

A fine powder mixture of fine powder of the modified PTFE with fine powder of the homo-PTFE was prepared by mixing as in Example 1, except that the blend ratio of the fine powder A of the modified PTFE to the fine powder B of the homo-PTFE was changed so that the proportion of the modified PTFE and the proportion of the homo-PTFE were as shown in Table 1.

Various measurements and evaluations were performed on the resulting fine powder mixture as in Example 1.

Comparative Example 1

Various measurements and evaluations were performed on the fine powder B of the homo-PTFE as in Example 1.

Comparative Example 2

Various measurements and evaluations were performed on the fine powder A of the modified PTFE as in Example 1.

Preparation Example 3

Preparation Example 3 was performed in accordance with the method disclosed in Example 5 in WO 2000/002935. The same autoclave as that used in Preparation Example 1 was charged with deionized water (2960 ml), paraffin wax (120 g), and ammonium perfluorooctanoate (0.6 g), and the system was purged with nitrogen gas three times and with TFE twice to remove oxygen, while the system was heated to 70° C. Then, the internal pressure was set to 1.03 MPa by TFE, the contents were stirred at 280 rpm, and the internal temperature was kept at 70° C.

Next, perfluoro propyl vinyl ether (PPVE) (3.0 g), an aqueous solution of disuccinic peroxide (270 mg) in deionized water (20 ml), and an aqueous solution of ammonium persulfate (11.25 mg) in deionized water (20 ml) were sequentially injected along with TFE into the autoclave. The internal pressure of the autoclave was kept at 1.08 MPa, the reaction temperature was kept at 70° C., and the stirring speed was kept at 280 rpm. TFE was successively supplied so that the internal pressure of the autoclave was constantly kept at 1.08±0.05 MPa.

After 150 g of TFE was consumed, a 20 wt % aqueous ammonium perfluorooctanoate solution was injected along with TFE, and after 1350 g of TFE was consumed, an aqueous solution of methanol (0.20 g) in deionized water (5 ml) was injected along with TFE.

After 1500 g of TFE was consumed, the stirring and the monomer supply were stopped, the gas in the autoclave was immediately discharged so that the pressure was reduced to ordinary pressure, and the reaction was terminated. Thus, an aqueous dispersion C of the modified PTFE was prepared. The resulting aqueous dispersion had a polymer concentration of 32.9 wt % and an average primary particle size of 0.24 μm.

Coagulation of the aqueous dispersion C was carried out as in Preparation Example 1 except that the temperature during the coagulation was changed to 30° C. Thus, fine powder C of the modified PTFE was prepared (PPVE modification: 0.13 wt %, SSG: 2.169, paste extrusion pressure at RR1600: 55 MPa).

Comparative Examples 3 and 4

Fine powder composed of the modified PTFE and the homo-PTFE was prepared by co-coagulation as in Example 2, except that an aqueous dispersion of the modified PTFE to be used as a raw material was changed to the aqueous dispersion C obtained in Preparation Example 3, and the blend ratio of the aqueous dispersion C to the aqueous dispersion B was changed so that the proportion of the modified PTFE and the proportion of the homo-PTFE were as shown in Table 1. Various measurements and evaluations were performed on the resulting fine powder as in Example 1.

Preparation Example 4

The following experiments were performed in accordance with the method disclosed in Example 4 in WO 2006/054612.

The same autoclave as that used in Preparation Example 1 was charged with deionized water (2960 ml), paraffin wax (120 g), and ammonium perfluorooctanoate (0.6 g), and the system was purged with nitrogen gas three times and with TFE twice to remove oxygen, while the system was heated to 70° C. Then, the internal pressure was set to 0.73 MPa by TFE, the contents were stirred at 280 rpm, and the internal temperature was kept at 70° C.

Next, perfluoro propyl vinyl ether (PPVE) (1.8 g), an aqueous solution of disuccinic peroxide (270 mg) in deionized water (20 ml), and an aqueous solution of ammonium persulfate (11.25 mg) in deionized water (20 ml) were sequentially injected along with TFE into the autoclave. The internal pressure of the autoclave was kept at 0.78 MPa, the reaction temperature was kept at 70° C., and the stirring speed was kept at 280 rpm. TFE was successively supplied so that the internal pressure of the autoclave was constantly kept at 0.78±0.02 MPa.

After 150 g of TFE was consumed, a 20 wt % ammonium perfluorooctanoate aqueous solution (19.5 g) was injected along with TFE, and the reaction was continued. After 1350 g of TFE was consumed, hexafluoropropylene (3.55 g) and an aqueous solution of methanol (0.50 g) in deionized water (5 ml) were injected along with TFE.

After 1500 g of TFE was consumed, the stirring and the monomer supply were stopped, the gas in the autoclave was immediately discharged so that the pressure was reduced to ordinary pressure, and the reaction was terminated. Thus, an aqueous dispersion D of the modified PTFE was prepared. The resulting aqueous dispersion had a polymer concentration of 32.8 wt % and an average primary particle size of 0.25 μm.

Coagulation of the aqueous dispersion D was carried out as in Preparation Example 1 except that the temperature during the coagulation was changed to 35° C. Thus, fine powder D of the modified PTFE was prepared (PPVE modification: 0.10 wt %, HFP modification: 0.03 wt %, SSG: 2.175, paste extrusion pressure at RR1600: 36 MPa).

Comparative Examples 5 and 6

A fine powder mixture of the modified PTFE with the homo-PTFE was prepared by mixing the PTFEs as in Example 1, except that fine powder of the modified PTFE to be used as a raw material was changed to the fine powder D obtained in Preparation Example 4, and the blend ratio of the fine powder D to the fine powder B was changed so that the proportion of the modified PTFE and the proportion of the homo-PTFE were as shown in Table 1. Various measurements and evaluations were performed on the resulting fine powder mixture as in Example 1. In Comparative Example 6, the mixture was partly broken during measurement of the strength at break. Measurements of the stress relaxation time, membrane thickness, and pressure loss were performed on an unbroken portion.

Preparation Example 5

Fine powder E of the modified PTFE (PPVE modification: 0.15 wt %, SSG: 2.161, paste extrusion pressure at RR1600: 72 MPa) was prepared in accordance with the method disclosed in Example 3 of JP 10-53624.

Example 5

A fine powder mixture of the modified PTFE with the homo-PTFE was prepared by mixing the PTFEs as in Example 4, except that the fine powder E of the modified PTFE obtained in Preparation Example 5 was used instead of the fine powder A of the modified PTFE, and the blend ratio of the fine powder E of the modified PTFE to the fine powder B of the homo-PTFE was as shown in Table 1. Various measurements and evaluations were performed on the resulting fine powder mixture as in Example 1.

Figure 3:
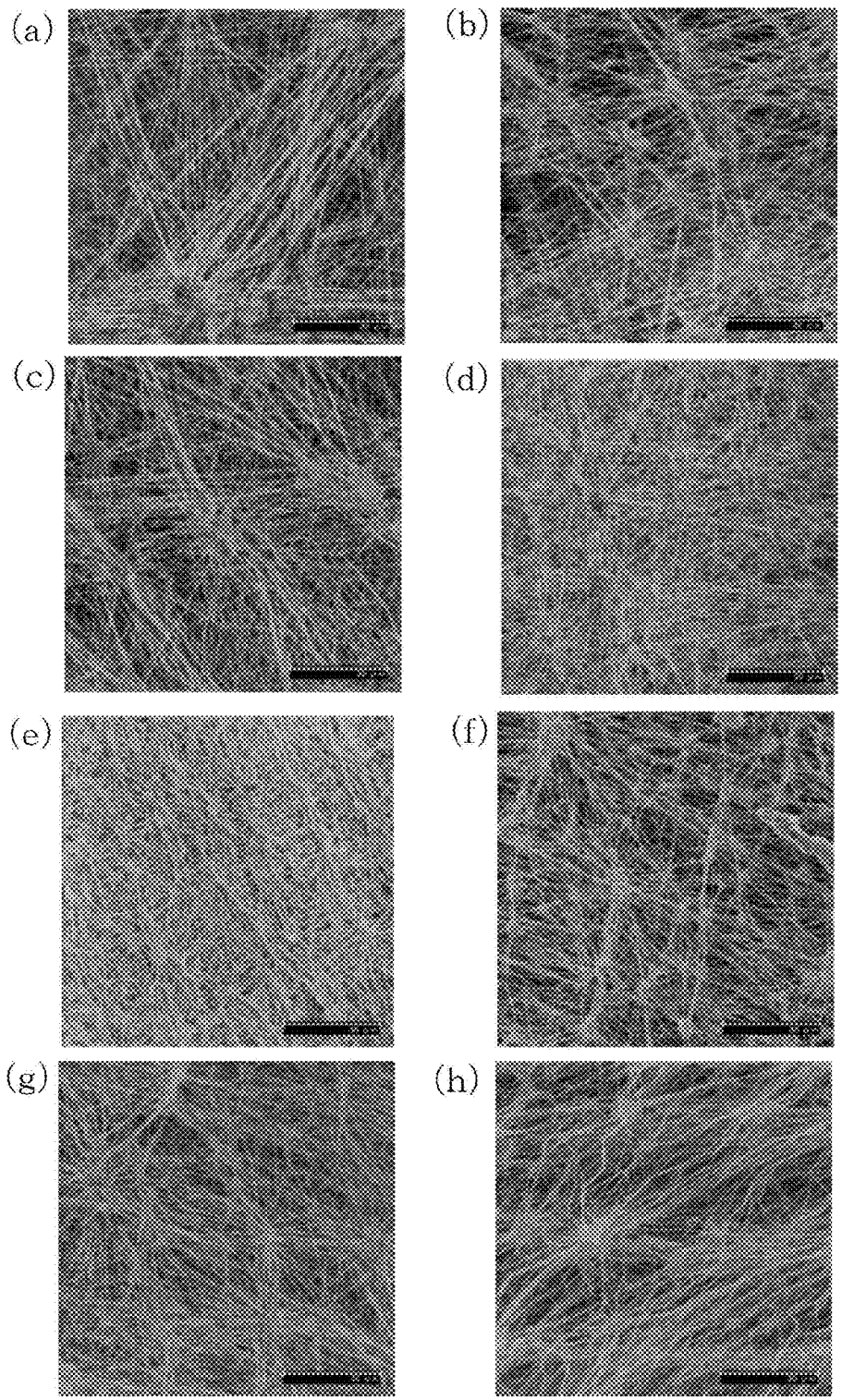
FIG. 3 shows electron microscope (SEM) pictures of PTFE porous membranes obtained in examples and comparative examples. The picture (a) is of Example 1, the picture (b) is of Example 2, the picture (c) is of Example 3, the picture (d) is of Example 4, the picture (e) is of Comparative Example 1, the picture (f) is of Comparative Example 4, the picture (g) is of Comparative Example 5, and the picture (h) is of Comparative Example 6.

Table 1 shows the results of the examples and comparative examples. FIG. 3 shows SEM pictures of PTFE porous membranes obtained in Examples 1 to 4 and Comparative Examples 1, 4, 5, and 6.

TABLE 1

|  |  | Example 1 | Example 2 | Example 3 | Example 4 | Comparative Example 1 | Comparative Example 2 |
|---|---|---|---|---|---|---|---|
| Modified PTFE | — | Preparation Example 1 | Preparation Example 1 | Preparation Example 1 | Preparation Example 1 | — | Preparation Example 1 |
| Proportion of modified PTFE | wt % | 70 | 70 | 50 | 30 | — | 100 |
| Homo-PTFE | — | Preparation Example 2 | Preparation Example 2 | Preparation Example 2 | Preparation Example 2 | Preparation Example 2 | — |
| Proportion of homo-PTFE | wt % | 30 | 30 | 50 | 70 | 100 | — |
| Mixing method | — | Dry mixing | Co-coagulation | Dry mixing | Dry mixing | — | — |
| SSG of mixture | — | 2.158 | 2.158 | 2.158 | 2.159 | 2.160 | 2.158 |
| Modified monomer | — | PPVE | PPVE | PPVE | PPVE | None | PPVE |
| Modification of mixture | wt % | 0.11 | 0.11 | 0.08 | 0.05 | — | 0.15 |
| Extrusion pressure (RR100) | MPa | 12.3 | 12.4 | 12.9 | 13.5 | 14.3 | 11.7 |
| Strength at break | N | 8.0 | 8.2 | 10.2 | 11.8 | 18.7 | Unmeasurable |
| Stress relaxation time | sec | 300 | 320 | 330 | 400 | 550 | Unmeasurable |
| Appearance of biaxially oriented membrane | — | Good | Very good | Good | Very good | Very good | Very poor |
| Thickness of biaxially oriented membrane | μm | 20 | 21 | 28 | 22 | 16 | Unmeasurable |
| Pressure loss | Pa | 53 | 56 | 87 | 117 | 447 | Unmeasurable |
| Coefficient of variation of pressure loss | — | 9.3 | 5.8 | — | — | — | — |

|  |  | Comparative Example 3 | Comparative Example 4 | Comparative Example 5 | Comparative Example 6 | Example 5 |
|---|---|---|---|---|---|---|
| Modified PTFE | — | Preparation Example 3 | Preparation Example 3 | Preparation Example 4 | Preparation Example 4 | Preparation Example 5 |

TABLE 1-continued

|  |  |  |  |  |  |  |
|---|---|---|---|---|---|---|
| Proportion of modified PTFE | wt % | 70 | 40 | 30 | 50 | 30 |
| Homo-PTFE | — | Preparation Example 2 | Preparation Example 2 | Preparation Example 2 | Preparation Example 2 | Preparation Example 2 |
| Proportion of homo-PTFE | wt % | 30 | 60 | 70 | 50 | 70 |
| Mixing method | — | Co-coagulation | Co-coagulation | Dry mixing | Dry mixing | Dry mixing |
| SSG of mixture |  | 2.166 | 2.161 | 2.163 | 2.165 | 2.16 |
| Modified monomer | — | PPVE | PPVE | PPVE, HFP | PPVE, HFP | PPVE |
| Modification of mixture | wt % | 0.09 | 0.05 | PPVE 0.03 HFP 0.01 | PPVE 0.05 HFP 0.02 | 0.05 |
| Extrusion pressure (RR100) | MPa | 9.0 | 10.8 | 11.3 | 9.8 | 12.9 |
| Strength at break | N | Unmeasurable | 8.6 | 11.2 | 7.6 | 11.2 |
| Stress relaxation time | sec | Unmeasurable | 450 | 380 | 220 | 380 |
| Appearance of biaxially oriented membrane | — | Very poor | Acceptable | Acceptable | Poor | Good |
| Thickness of biaxially oriented membrane | μm | Unmeasurable | 56 | 30 | 32 | 28 |
| Pressure loss | Pa | Unmeasurable | 102 | 176 | 76 | 90 |
| Coefficient of variation of pressure loss | — | — | — | — | — | — |

The results in Table 1 show that low pressure loss and excellent membrane appearance are achieved in the membranes of Examples 1 to 4. The membrane of Comparative Example 1 has excellent membrane appearance, but has high pressure loss. In Comparative Examples 2, 3, and 6, a porous membrane is not prepared because the sample is broken during stretching. The membranes of Comparative Examples 4 and 5 tend to have low pressure loss, but have poor membrane appearance.

INDUSTRIAL APPLICABILITY

The PTFE mixture of the present invention is suitable for a stretchable material, and in particular, suitable for a material for producing a PTFE porous membrane.

EXPLANATION OF SYMBOLS

1: Unwind roll of unsintered film
2, 18: Take-up roll
3, 4, 5, 8, 9, 10, 11, 12: Roll
6, 7: Heat roll
13: Unwind roll of film stretched in longitudinal direction
14: Preheating zone
15: Stretching zone
16: Heat setting zone
17: Lamination roll

The invention claimed is:

1. A polytetrafluoroethylene mixture comprising:
a modified polytetrafluoroethylene having no history of being heated to a temperature of 300° C. or higher, and having a peak top in the range of from 333° C. to lower than 340° C. in a heat-of-fusion curve which is constructed using a differential scanning calorimeter at a temperature increase rate of 10° C./min; and
a fibrillable polytetrafluoroethylene homopolymer having no history of being heated to a temperature of 300° C. or higher,
the modified polytetrafluoroethylene having a cylinder extrusion pressure, at a reduction ratio of 1600, of 70 MPa or higher,
wherein the mass ratio of the modified polytetrafluoroethylene to the polytetrafluoroethylene homopolymer, that is, modified polytetrafluoroethylene/polytetrafluoroethylene homopolymer, is 10 to 90/90 to 10.

2. The polytetrafluoroethylene mixture according to claim 1,
wherein the modified polytetrafluoroethylene has a cylinder extrusion pressure, at a reduction ratio of 1600, of 80 MPa or higher.

3. The polytetrafluoroethylene mixture according to claim 1,
wherein the modified polytetrafluoroethylene includes a modified monomer unit in an amount of 0.005 to 0.500 wt % of the weight of all monomer units.

4. The polytetrafluoroethylene mixture according to claim 1,
wherein the modified polytetrafluoroethylene has a standard specific gravity (SSG) of 2.130 to 2.185.

5. The polytetrafluoroethylene mixture according to claim 1,
wherein the polytetrafluoroethylene homopolymer has a cylinder extrusion pressure, at a reduction ratio of 100, of 10 to 35 MPa.

6. The polytetrafluoroethylene mixture according to claim 1,
wherein the polytetrafluoroethylene homopolymer has a cylinder extrusion pressure, at a reduction ratio of 100, of 10 to 20 MPa.

7. The polytetrafluoroethylene mixture according to claim 1 obtainable by coagulation of an aqueous dispersion containing the modified polytetrafluoroethylene and the polytetrafluoroethylene homopolymer.

8. A polytetrafluoroethylene porous membrane obtainable by stretching the polytetrafluoroethylene mixture according to claim 1.

* * * * *